United States Patent [19]

Lynch

[11] 4,356,986
[45] Nov. 2, 1982

[54] SAFETY VALVE SUPPORT

[76] Inventor: Hugh C. Lynch, P.O. Box 30112, AMF, Memphis, Tenn. 38130

[21] Appl. No.: 300,651

[22] Filed: Sep. 9, 1981

[51] Int. Cl.³ .................................................. F16L 5/00
[52] U.S. Cl. ..................................... 248/57; 211/105.4
[58] Field of Search .......................... 248/56, 57, 65, 70, 248/71, 72, 27.1, DIG. 6, 68; 211/105.4, 105.3, 123, 124

[56] References Cited

U.S. PATENT DOCUMENTS

| 796,178 | 8/1905 | Beaton | 248/57 |
| 858,140 | 6/1907 | Beaton | 248/57 |
| 1,792,853 | 2/1931 | McConnell | 211/105.4 X |
| 2,317,893 | 4/1943 | DiMartino | 211/105.3 |
| 2,537,437 | 1/1951 | Aaby | 248/57 |
| 3,163,386 | 12/1964 | Collins | 248/57 X |
| 3,891,091 | 6/1975 | Anderson | 211/105.3 |

FOREIGN PATENT DOCUMENTS 541574 12/1941 United Kingdom ............. 248/68 R

Primary Examiner—William H. Schultz
Assistant Examiner—Ramon O. Ramirez

[57] ABSTRACT

An anchor for supporting a device such as a safety valve in a space between opposed walls is comprised of a channel to which the device is secured, slides at each end of the channel and screws for driving the slides outwardly against opposite walls of the opening.

2 Claims, 6 Drawing Figures

SAFETY VALVE SUPPORT

OBJECTS

The primary object of this invention is to provide what is essentially a pipe hanger and particularly a device for supporting and anchoring a safety valve in an opening through a base member such as a concrete island. A particular object is to provide a manually operable anchor which can be installed in existing gas dispensing systems wherein the size of the opening may vary from dispenser to dispenser and where the pipe in which the safety valve is connected may be mounted either centrally or somewhat towards either side of the opening. It is particularly intended that the anchor be installable with a minimum of skill and labor and with only rudimentary tool such as a wrench, needed for the installation.

These and other objects will be apparent in the following specification and drawing in which.

Figure 1:
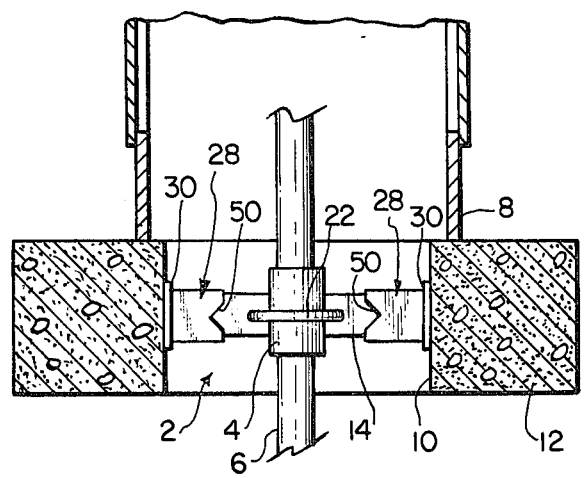
FIG. 1 is a front elevational view of the anchoring device used for anchoring a safety valve in the pump box of a typical gas dispensing system.
Figure 2:
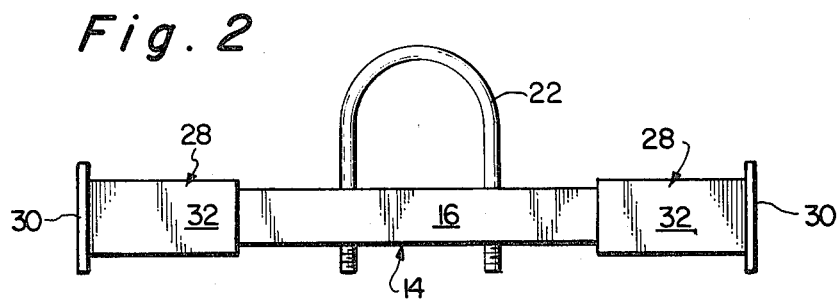
FIG. 2 is a top view of the anchoring device.
Figure 3:
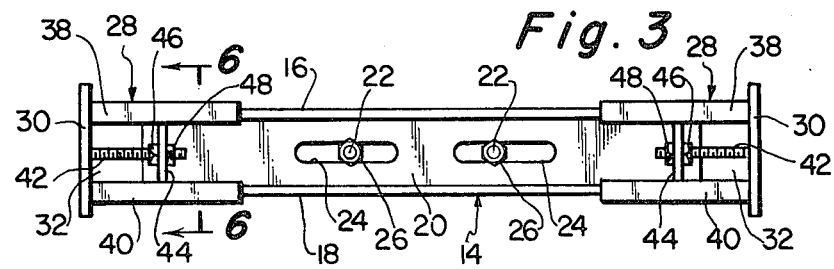
FIG. 3 is a rear elevational view of the anchoring device shown in extended position.
Figure 4:
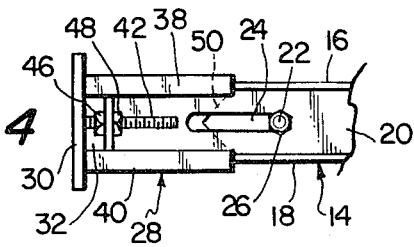
FIG. 4 is a partial rear elevational view of the anchoring device shown in a relatively retracted position.
Figure 5:
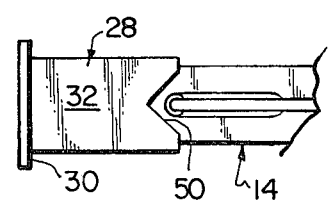
FIG. 5 is a partial front elevational view of the anchoring device.
Figure 6:
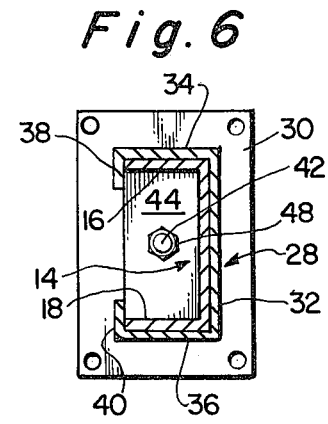
FIG. 6 is a cross-sectional view of the anchoring device as taken on the line 6—6 of FIG. 3.

Referring now to the drawing, in which like referenced numerals denote similar elements, the anchoring device 2 is devised for supporting a safety valve 4 connected in a gas line 6 which leads from a tank below (not shown) to a dispensing device (not shown) in the casing 8. Casing 8 is conventionally mounted over an opening 10 in a concrete island 12. It is essential that the safety valve 4 be adequately supported in the island opening 10 so that if the dispensing device be collided with and perhaps knocked over, the shear section of the valve will shear off thereby allowing the safety valve to shut off the flow of gas to the dispenser.

Anchoring device 2 consists of a channel 14 having upper and lower flanges 16 and 18 integrally connected by a web 20. The safety valve 4 is mounted onto channel 14 by a U bolt whose ends engage through slots 24 in the channel web, the bight of the U embracing the safety valve and being clamped thereto by means of nuts 26 threaded onto the ends of the U-bolt. The slots 24 in the channel web 20 provide for lateral adjustment to one side or the other, as needed, of the opening.

The anchoring device 2 is jammed between opposite sides of the opening 10 by means of slides 28 on each end of the channel, the outer ends of the slides terminating in abutments 30 which engage against the sides of the opening 10. Each slide 28 consists of a web 32 and flanges 34 and 36 which slidingly engage over the flanges 16 and 18 and web 20 of channel 14. The slides 32 have lips 38 and 40 at the ends of flanges 34 and 36, the lips slidably engaging against the ends of the channel flanges so as to prevent dislodgement of the slides from the channel. The slides are driven outwardly by screws 42 which extend through plates 44, and which are integrally affixed, as by welding, across the channel 14 adjacent its ends. Screws 42 engage through openings through plates 44, and their outer ends respectively engage against abutments 30 so as to drive the slides outwardly when nuts 46, 48 on the screws are appropriately turned. V-notches 50 in the webs 32 provide clearance of the U bolt if the latter is moved to an extreme position towards ends of the slots and if an adjacent the slide is adjusted to an extreme inward position.

In operation, the anchoring device is disposed across the opening 14 in island 12 and the nuts 46, 48 are so that the screws drive slides 28 outwardly and jam the abutments 30 against the opposite sides of the opening, and the safety valve 4 is mounted on the channel by means of U bolt 22.

I claim:

1. An anchor for supporting a safety valve in a space between two opposed surfaces, comprising:
   an elongate generally C-shaped channel having a spaced pair of flanges integrally connected by a web,
   means for mounting a safety valve on the channel between opposite ends thereof,
   a pair of slides slidably engaging over opposite end portions of the channel, each slide comprising a spaced pair of generally C-shape flanges integrally connected by a web and inwardly extending lips on the free edges thereof,
   the webs and channels of the slides slidably engaging over the flanges and web of the channel and the lips on the slide flanges engaging over free edges of the channel flanges,
   and screw means engaging between the channel and the slides for driving the slides outwardly whereby to jam the slides against the surfaces of opposed sides of the opening.

2. An anchoring device as claimed in claim 1, said screw means comprising plates integrally affixed across said channel at locations disposed inwardly from the ends thereof,
   each plate having an opening therethrough,
   said slides each having an abutment plate integrally affixed across an outer end thereof,
   and said screw means including screws respectively engaging through the openings in the plate and respectively engaging against the abutment plates on the slides.

* * * * *

UNITED STATES PATENT AND TRADEMARK OFFICE
CERTIFICATE OF CORRECTION

PATENT NO. : 4,356,986
DATED : Nov. 2, 1982
INVENTOR(S) : Hugh C. Lynch

It is certified that error appears in the above—identified patent and that said Letters Patent is hereby corrected as shown below:

In column 2, line 16, delete "the", second occurrence.

In column 2, line 19, after "are", insert --turned--.

Signed and Sealed this

Twenty-second Day of March 1983

[SEAL]

Attest:

GERALD J. MOSSINGHOFF

Attesting Officer

Commissioner of Patents and Trademarks